United States Patent [19]

Furbee

[11] Patent Number: 4,736,983
[45] Date of Patent: Apr. 12, 1988

[54] SHOCK ABSORBER FOR A BICYCLE SEAT

[76] Inventor: Raymond D. Furbee, 12726 Oxnard St., N. Hollywood, Calif. 91606

[21] Appl. No.: 935,316

[22] Filed: Nov. 26, 1986

[51] Int. Cl.⁴ .............................................. B62J 1/02
[52] U.S. Cl. .................................... 297/209; 248/600; 297/208
[58] Field of Search ....................... 297/209, 211, 208; 267/60, 61 R; 248/600, 601; 280/283; 403/109, 104

[56] References Cited

U.S. PATENT DOCUMENTS

| 575,815 | 1/1887 | Todd | 297/209 X |
| 640,483 | 1/1900 | McKenzie | 248/601 |
| 651,277 | 6/1900 | Smith | 248/601 |
| 1,391,495 | 9/1921 | Parsons | 403/104 X |
| 3,229,954 | 1/1966 | Hendricks | 248/600 |
| 4,182,508 | 1/1980 | Kallai | 297/209 |

FOREIGN PATENT DOCUMENTS 96335 9/1896 Fed. Rep. of Germany ...... 297/209

Primary Examiner—James T. McCall

[57] ABSTRACT

This shock absorber is designed to dampen the jarring put on a bicycle frame and seat. Primarily, it consists of a sleeve with a post slideable within, and the sleeve is clamped in the opening normally provided in the bicycle frame. A coil spring is received on the post for dampening the shock of the road and a provision is made to prevent rotation of the post and seat also.

4 Claims, 1 Drawing Sheet

U.S. Patent   Apr. 12, 1988   4,736,983
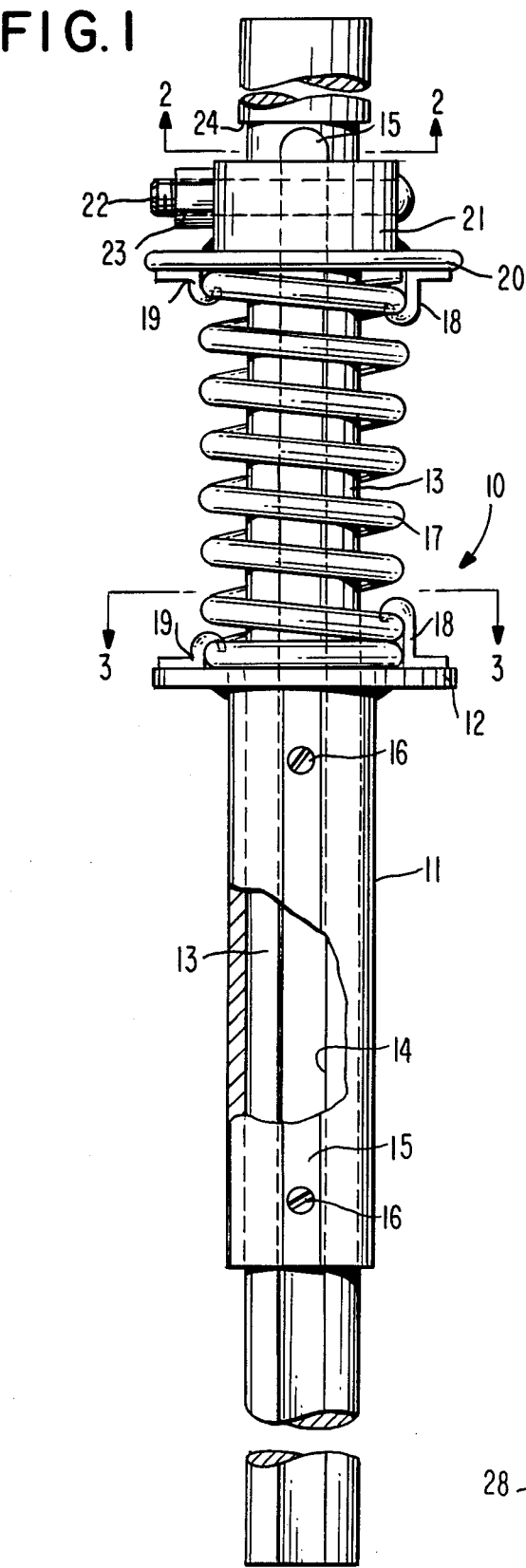
FIG. 1
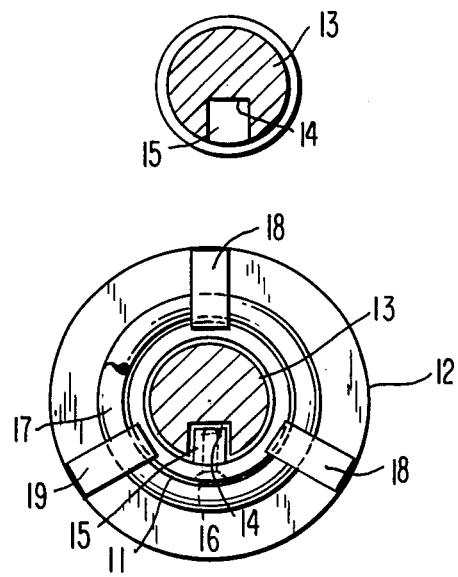
FIG. 2
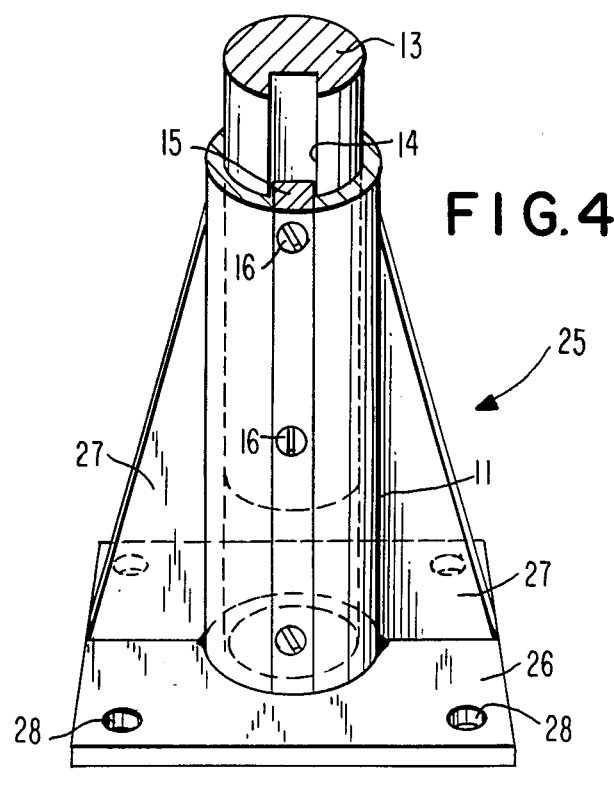
FIG. 3
FIG. 4

SHOCK ABSORBER FOR A BICYCLE SEAT

BACKGROUND OF THE INVENTION

1. Field of the Invention

This invention relates to devices for bicycles, and more specifically, to a shock absorber for a bicycle seat.

2. Description of Prior Art

References of record are the U.S. Pat. Nos. 3,466,086, of Carl A. James, et al, Frank P. Brilando, et al 3,481,628, Albert Kamin, et al 3,528,700, and Robert H. Mesinger 3,606,383.

The principal object of this invention is to provide a shock absorber for a bicycle seat, which will be so designed, as to eliminate the jarring condition normally caused to a person by seats mounted with a stationary set-up while operating on rough surfaces on or off road, and the assembly will be adaptable to virtually any type seat, whether it be a bicycle seat or a seat on farm, heavy or recreational equipment.

Another object of this invention is to provide a shock absorber for a bicycle seat, which will be so designed, as to be particularly appreciated by those who have had a serious back injury or various back discomforts, which previously were aggravated by bicycle riding on any normal city road.

A further object of this invention is to provide a shock absorber for a bicycle seat, which will eliminate the jarring, because the seat post will no longer be clamped to the bicycle frame, but instead, floats independently of the bicycle frame, and any shock experienced by the bicycle frame, will not be transferred to the seat and thus, to the person sitting on it, and it will be especially attractive to senior citizens who wish to ride bicycles for inexpensive transportation or pleasure.

A still further object of this invention is to provide a shock absorber for a bicycle seat, which when employed on all types of equipment, will enable its operator to use their equipment for long periods of time with more comfort and less body fatigue, because the body will not be bounced and jolted so much by rough surfaces, especially off road, and the design is also such, that it will fit inside a bicycle frame where the seat post of the prior art went, and it is clamped in place by tightening the securement means provided on the conventional bicycle frame.

SUMMARY OF THE INVENTION

A shock absorber for a bicycle, comprising a sleeve with a post therein, and the sleeve is clamped into the frame of the bicycle where the previous seat post was clamped. The shock absorber also is provided with rotation prevention means. A compression coil spring is provided for shock absorption means and is disposed between a flange of the sleeve and a conventional clamp employed on the assembly.

BRIEF DESCRIPTION OF THE DRAWINGS

FIG. 1 is a vertical view of the present invention, shown in elevation and partly in section;

FIG. 2 is a transverse view, taken along the line 2—2 of FIG. 1;

FIG. 3 is a transverse view, taken along the line 3—3 of FIG. 1, and

FIG. 4 is a fragmentary perspective view of a modified mounting means for a vehicle other than a bicycle.

DETAILED DESCRIPTION

Accordingly, a shock absorber 10 is shown to include a sleeve 11 having a flange 12 welded or otherwise secured to its upper end, and a seat post 13 is received on the interior of sleeve 11. A key slot 14 is provided longitudinally in the outer periphery of post 13 and receives a solid key stock 15 that is fastened therein by screw fasteners 16, and it is to be recognized that the diameter of sleeve 11 may vary in accordance with the frame designs of bicycles. A coil spring 17 is received on post 13 and engages with flange 12 of sleeve 11 at one end. Spring hold-down brackets 18 and 19 are welded secure to a surface of flange 12 and retain spring 17 therein, and a second group of hold-down brackets 18 and 19 are similarly fastened to flange 20 welded to a conventional clamp 21, for retaining the opposite end of spring 17. The bolt 22 and nut 23 of clamp 21 provide for tightening clamp 21 around post 13 for any desired elevation, and the spring 17 provides the shock absorbing means for the assembly of shock absorber 10. The outside diameter of post 13 has an approximate clearance of 0.010 less than the inside diameter of sleeve 11, enabling free sliding inside of sleeve 11 as spring 17 compresses and expands, and a shoulder 24 is provided on post 13 for limiting upward travel of clamp 21 of the assembly. The key slot 14 is a recommended one-quarter of an inch, plus 0.005 clearance in width and depth for the sliding up and down of key stock 15, and the combination of 14 and 15 prevents any side to side twist of the seat mounted to shock absorber 10. The flange 12 will rest or engage with the top of a bicycle frame where the previous seat post normally comes out of.

In installation and use, the sleeve 11 is secured with the flange 12 on the frame of a bicycle by tightening the clamp means of the frame on sleeve 11, and the seat is simply clamped to the top of post 13. After the above, the clamp 21 is tightened at the elevation desired. When the bicycle is being ridden, the post 13 slides up and down and the spring 17 compresses and expands to dampen the jarring of the person engaged with the seat of post 13.

Referring now to FIG. 4, a modified surface mount 25 is provided, which is intended for attaching to a vehicle, such as a tractor. In this instance, the same sleeve 11 is welded to a plate 26 at its bottom and gussets 27 are similarly welded to plate 26 and the outer peripheral surface of sleeve 11.

In installation, the plate 26 is bolted where the usual seat mounting bracket is located. The seat is then mounted to post 13 by the use of a receptacle, (not shown), at least one inch deep, that post 13 will fit into. Then by drilling a hole and using a pin through that receptacle and the top, one and one-half inches of post 13 is mounted to the underside of the seat by welding or bolting. The function is the same as heretofore described, with the exception of the mounting means.

While various changes may be made in the detail construction, such changes will be within the spirit and scope of the present invention, as defined by the appended claims.

I claim:

1. In a bicycle having a frame with a sleeve slidably supporting a seat post, the combination which comprises;

a shock-absorbing means disposed between said sleeve and said seat post for eliminating the jarring condition normally caused to a person mounted on said seat post while operating on rough surfaces;

said shock absorbing means comprising a pair of collars carried on said sleeve and said seat post respectively in spaced-apart relationship;

a resilient helical spring surrounding said seat post and having its opposite ends secured to said pair of collars so as to be compressible between said pair of collars in response to sliding movement of said seat post into said sleeve;

said helical spring being totally external of said sleeve wherein said seat post moves through the interior of said helical spring into and out of said sleeve during said operating procedure on rough surfaces;

non-rotational means comprising an elongated slot provided on said seat post and a projecting key carried on said sleeve in sliding relationship with said slot; and a detachable connector securing said collar to said seat post for securing one end of said helix spring to said seat post.

2. A shock absorber for a bicycle comprising the combination of:

a frame sleeve having an open bore;

a seat;

a post having two ends, one end of which is secured to said seat and the other end insertably disposed into said sleeve via its open bore in sliding relationship;

a first collar secured to said post in fixed spaced relationship to said post's other end within said sleeve;

a second collar secured to said sleeve immediately adjacent to its open bore;

an expansion helical spring surrounding said post having its opposite ends bearing against said first and said second collars respectively; and a key and slot arrangement provided on said post and sleeve cooperating to prevent rotation between said post and sleeve as said post moves into and out of said sleeve during use.

3. The invention as defined in claim 2 including:

hooks carried on each of said collars engaging with the endmost rungs of said helical spring integrally connecting said sleeve, said spring and said pair of collars into a unitary construction.

4. The invention as defined in claim 3 including:

a clamp disposed on said collar carried on said post for adjusting the securement position of said collar on said post.

* * * * *